W. G. HUGHES.
FLUID PRESSURE CONTROLLER.
APPLICATION FILED MAY 7, 1908.
917,300.
Patented Apr. 6, 1909.
2 SHEETS—SHEET 2.
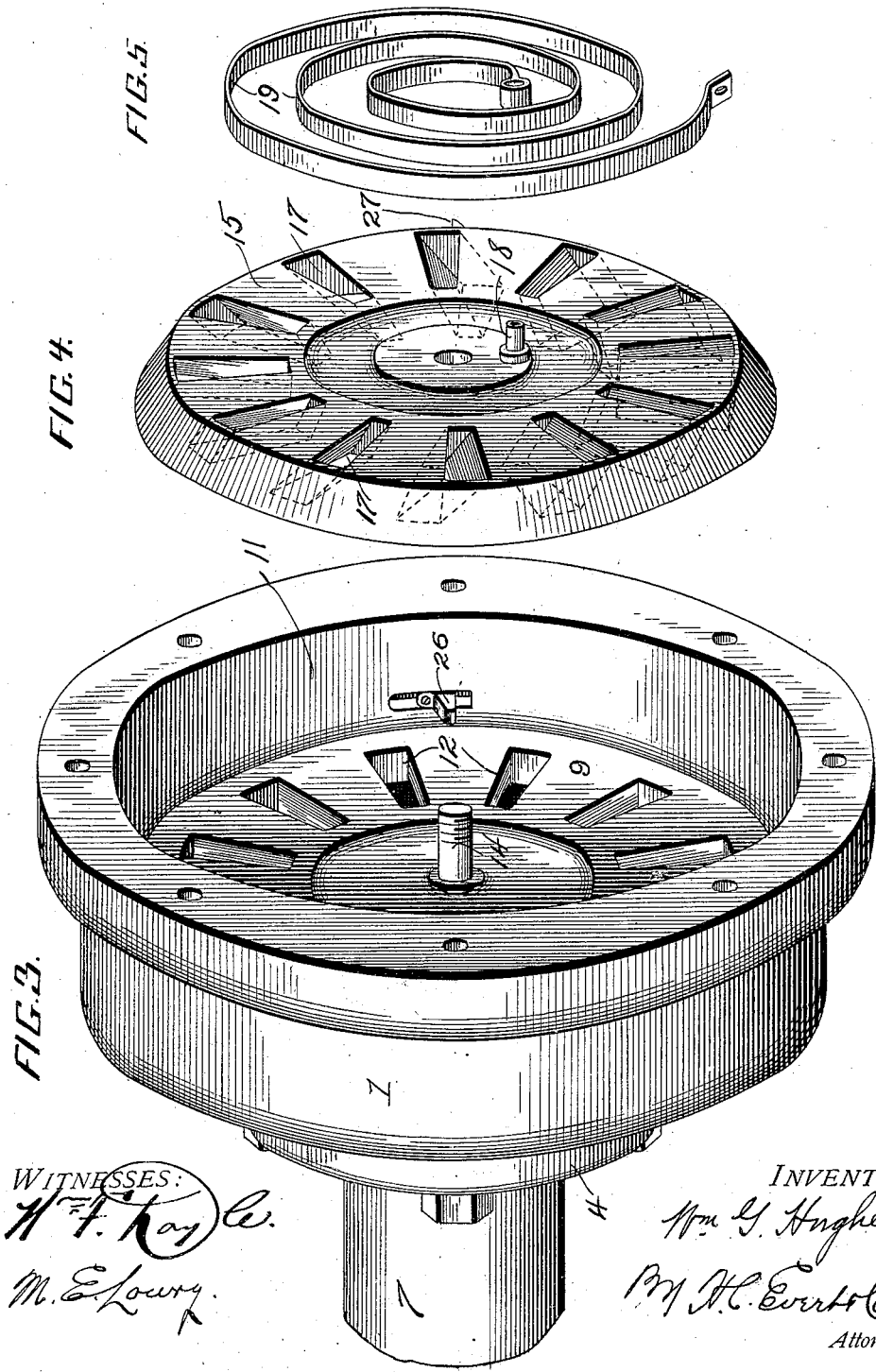

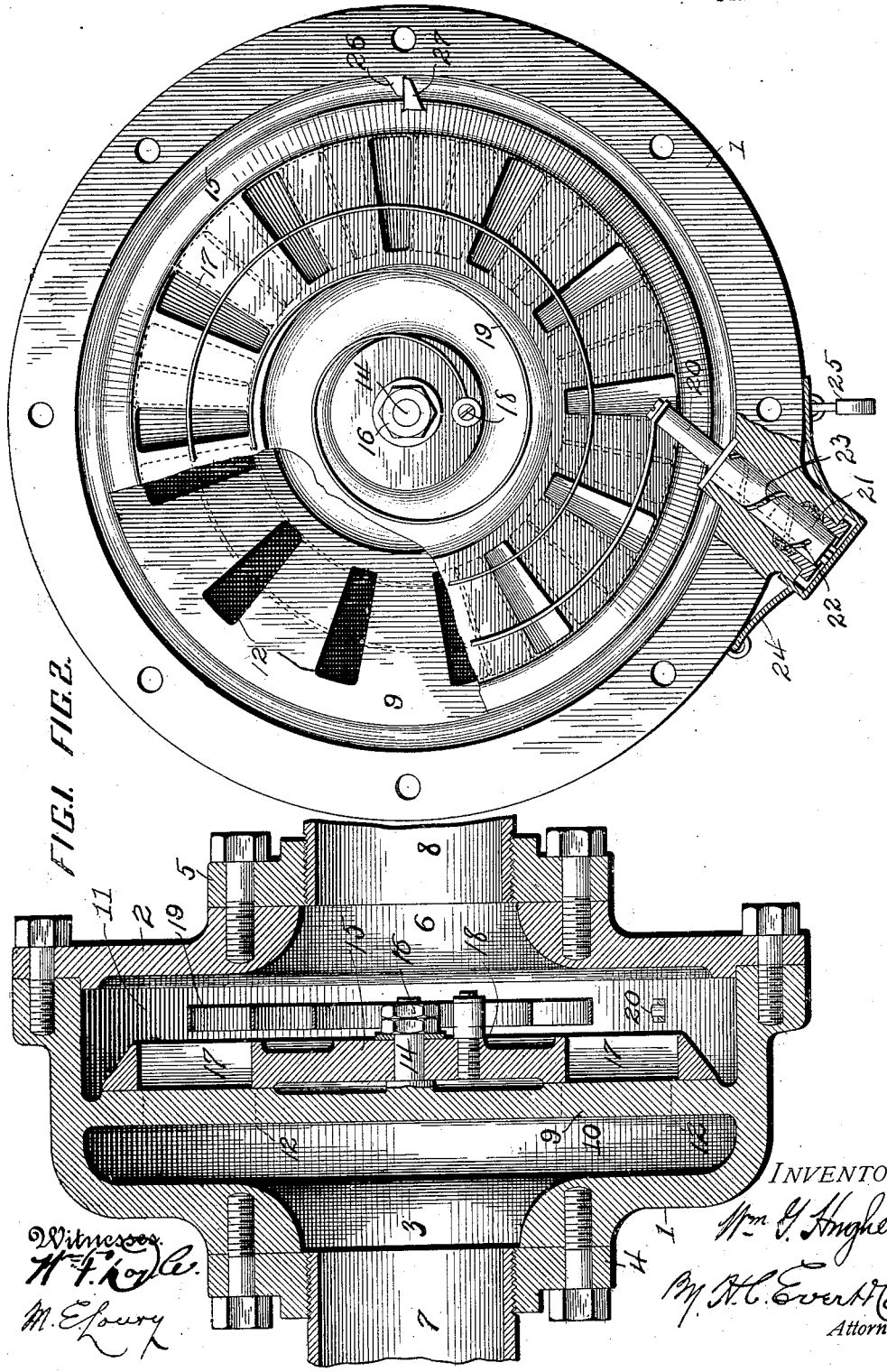

UNITED STATES PATENT OFFICE.

WILLIAM G. HUGHES, OF PITTSBURG, PENNSYLVANIA, ASSIGNOR TO PITTSBURG APPLIANCE COMPANY, OF PITTSBURG, PENNSYLVANIA, A CORPORATION OF SOUTH DAKOTA.

FLUID-PRESSURE CONTROLLER.

No. 917,300.

Specification of Letters Patent.

Patented April 6, 1909.

Application filed May 7, 1908. Serial No. 431,424.

*To all whom it may concern:*

Be it known that I, WILLIAM G. HUGHES, a citizen of the United States of America, residing at Pittsburg, in the county of Allegheny and State of Pennsylvania, have invented certain new and useful Improvements in Fluid-Pressure Controllers, of which the following is a specification, reference being had therein to the accompanying drawing.

This invention relates to fluid pressure controllers, and has for its main object to provide means whereby the pressure on the inlet and discharge sides of a meter or other fluid measuring device is maintained practically equal.

While the device comprising the subject matter of this invention is primarily designed for the controlling of gas, both natural gas and artificial gas, and will be herein described as adapted to a gas service line, yet it is to be understood that the device is by no means confined to this particular use, but is applicable for the controlling of any fluid wherein it is desired to regulate the pressure on opposite sides of a measuring device.

A practical embodiment of the invention is shown in the accompanying drawings, and will be hereinafter described in detail, without, however, limiting myself to the construction herein shown and described, as in the practice of the invention, the same is susceptible to many changes in details of construction without departing from the spirit thereof or from the scope of the appended claims.

In the drawings:—Figure 1 is a central vertical sectional view of a fluid pressure controller constructed in accordance with my invention. Fig. 2 is a plan view of the casing constituting the pressure chamber, the face plate thereof being removed, and the rotary member being partly broken away so as to show the openings in the stationary member of the casing, part of the latter being also in section to show the means for regulating the tension of the spring. Fig. 3 is a perspective view of the casing constituting the pressure chamber, the face plate thereof being removed. Fig. 4 is a similar view of the movable member of the controller, and Fig. 5 is a like view of the tension spring, detached from its position in the controller.

To practice my invention, a device embodying the improvements to be herein described in detail, is placed in the gas service line at a point "beyond" the meter, that is, the controller is placed in the gas service line on the discharge side of the meter, or, in other words, is placed in the gas service line at a point between the meter and the point of consumption. By the interposing of the controller in the gas or other fluid line between the meter and the point of consumption, the "draw" that naturally obtains when the fluid is being used, is on the controller instead of on the meter, and the pressure on the discharge side of the meter is thereby maintained practically equal with the pressure on the inlet side of the meter, so that the latter is practically balanced. By the balancing of the meter, an absolutely true registering of the latter is obtained, due to the fact that substantially the same pressure exists on the inlet and discharge sides of the meter, causing the registering wheel of the meter to cease rotation immediately upon the flow of fluid being shut off at the point of consumption.

Under normal existing circumstances, where no regulator or controller is employed at a point between the meter and the point of consumption, the pressure on the inlet side of the meter exceeds materially that on the discharge side thereof, and it is obvious that the paddle wheel or other form of registering wheel in the meter has a tendency to continue to revolve for a short period of time after the gas is shut off at the point of consumption, due to the excess pressure on the inlet side and the existing draw on the outlet side, so that the meter continues to register although no fluid is being delivered after the same has been shut off at the point of consumption. By the aid of my device I have successfully overcome this serious defect, and will now proceed to describe in detail a practical embodiment of the invention as shown in the drawings.

1 in the drawings indicates a casing constituting a pressure chamber, to the large open end of which casing is secured in any suitable manner a face plate 2. Secured to the inlet end 3 of the casing is a ring or collar 4, a similar ring or collar 5 being secured to the face of the plate 2 around the outlet or discharge opening 6, these rings or collars being provided for the purpose of connecting the inlet pipe 7 and outlet pipe 8 with the pressure chamber. The inlet pipe 7 leads to the discharge side of a meter (not shown) while it will be understood that the outlet pipe 8 from the pressure chamber leads to the point of consumption of the gas or other fluid.

In the casing 1 is a partition 9, separating the pressure chamber into an inlet compartment 10 and a discharge compartment 11. This dividing partition 9 is provided with a plurality of circumferentially arranged ports 12, radially disposed with respect to the axis of the partition 9, and preferably of a form as shown, that is, somewhat elongated, with the outer ends thereof wider than the inner ends as is clearly seen in Figs. 2 and 3 of the drawings. The partition 9 is provided centrally thereof with a stud or bearing post 14, on which is mounted the movable member or oscillatory controller disk 15. The said movable member or controller disk is, in practice, so mounted on the stud or bearing post 14 as to reduce the friction to a minimum, and may be held on said stud or bearing post by a nut or nuts 16, or in any other desirable manner. This movable member or controller disk is provided with circumferentially arranged radially disposed ports 17, of an area substantially equal to the area of the ports 12, these ports or openings 17, however, extending through the movable member or controller disk at an angle, or in other words, passing diagonally or obliquely through the disk as clearly seen by reference to Figs. 2 and 4. The movable member or controller disk carries an eccentrically mounted stud 18 to which is connected the inner end of the tension regulating spring 19, the other end of said spring being connected to the inner end of a regulating rod 20. The said regulating rod 20 is mounted in a sleeve 21 arranged in the casing 1, the rod 20 projecting beyond the inner end of the sleeve, and also suitably formed on its outer end that it may be operated by a suitable instrument, that is, the said rod is provided on the outer end with a wrench receiving head, or with a slot to receive a screw driver, or both. The sleeve 21 is provided with a spirally disposed groove 22, and the rod is provided with a pin 23 which takes into said groove, and thus, as the rod is turned inwardly or outwardly, the tension on the spring 19 will be increased or decreased according to the direction of rotation imparted to the rod 20.

In order to prevent tampering with the above described spring adjusting mechanism, I preferably hinge a closure cap 24 to the casing 1 so as to cover the adjusting mechanism, and lock said closure cap in any suitable and desired manner, as by padlock 25.

It is desirable, and in fact, may be said to be necessary, that means be provided whereby the movable member or controller disk may not at any time so position itself as to entirely shut off the flow of fluid through the ports or openings 12 and 17. Consequently, a stop must be provided for the movable member or controller disk to prevent the latter resting in such a position that ports 17 are entirely out of registry with ports 12. This may be accomplished, however, in various different ways, a practical illustration being herein shown which consists in providing a stop or abutment 26 on the inner wall of the casing to be engaged by a stop or abutment 27 on the periphery of the disk 15. These abutments or stops may be integral with the respective members, and so positioned that when in engagement, the ports or openings 17 will have a small portion thereof registering with the ports or openings 12 so as to allow the gas to flow from the inlet side to the outlet side of the controller. It is desirable, however, that this means be made adjustable, so that any desired normal opening for the passage of the gas or other fluid may be obtained. This I accomplish in the present construction by making the stop or abutment 26 adjustable as shown in Fig. 3 of the drawings. In this construction the said stop or abutment is mounted in a groove, and secured as by a screw, and may thus be moved to any desired position. It will of course be evident that this means of obtaining this adjustment is susceptible to various changes.

The construction of the device will, it is thought, from the above description be clearly understood to those conversant with the art. To more clearly point out the operation of the device, however, it may be stated that when the pressure on the discharge side of the controller is lessened, the movable disk 15 against the tension of the spring 19, moves so as to open the ports to accommodate the consumption of fluid. As the pressure on the discharge side of the meter (between the meter and controller) is greater than the pressure on the discharge side of the controller, the disk is caused to move on its axis against the action of the spring 19, the movement of this disk being in accordance with the pressure of the gas or other fluid on the inclined walls of the parts 17 in the movable disk. Since, by the interposing of the controller in the line between the meter and the point of consumption of the fluid, the pressure on the discharge side of the meter is maintained practically the same as the pressure on the inlet side of the meter, it will be observed that immediately upon the gas or other fluid being shut off at the point of consumption, that, the paddle wheel of the meter will instantly come to rest, and the tendency of the wheel to continue to revolve owing to excess on the inlet side of the meter is entirely obviated. Thus, it is entirely impossible for the meter wheel to revolve and thus register when no gas or other fluid is being delivered, and an absolutely true and reliable registering of the meter is assured.

Having now fully described my invention, what I claim as new and desire to secure by Letters Patent is:—

1. A fluid pressure controller comprising a casing constituting a pressure chamber and having its bottom formed with an inlet opening, a removable cover secured to said casing and formed with an outlet opening, a partition within and integral with said casing, said partition provided with radially disposed ports for the passage of a fluid, and said partition forming said chamber into an inlet and an outlet compartment, a bearing stud projecting from one face of said partition, an oscillatory controller disk mounted on said stud disposed in said outlet compartment, seated on said partition and provided with radially disposed ports or openings for the passage of the fluid, the ports of the disk adapted to register wholly or partly with the ports in the partition, a stud connected and disposed eccentrically with respect to one face of said disk, a sleeve mounted in said casing, a regulating rod adjustably mounted in said sleeve, and a tension spring connected at one end to the stud on the disk and at its other end secured to the inner end of said rod.

2. A fluid pressure controller comprising a casing constituting a pressure chamber and having its bottom formed with an inlet opening, a removable cover secured to said casing and formed with an outlet opening, a partition within and integral with said casing, said partition provided with radially disposed ports for the passage of a fluid, and said partition forming said chamber into an inlet and an outlet compartment, a bearing stud projecting from one face of said partition, an oscillatory controller disk mounted on said stud disposed in said outlet compartment, seated on said partition and provided with radially disposed ports or openings for the passage of the fluid, the ports of the disk adapted to register wholly or partly with the ports in the partition, a stud connected and disposed eccentrically with respect to one face of said disk, a sleeve mounted in said casing, a regulating rod adjustably mounted in said sleeve, a tension spring connected at one end to the stud on the disk and at its other end secured to the inner end of said rod, said disk having a beveled edge, a stop projecting laterally from the beveled edge of the disk, and an abutment projecting from the inner wall of the casing and extending in the path of said stop whereby the movement of said disk is arrested in one direction.

3. A fluid pressure controller comprising a casing constituting a pressure chamber and having its bottom formed with an inlet opening, a removable cover secured to said casing and formed with an outlet opening, a partition within and integral with said casing, said partition provided with radially disposed ports for the passage of a fluid, and said partition forming said chamber into an inlet and an outlet compartment, a bearing stud projecting from one face of said partition, an oscillatory controller disk mounted on said stud disposed in said outlet compartment, seated on said partition and provided with radially disposed ports or openings for the passage of the fluid, the ports of the disk adapted to register wholly or partly with the ports in the partition, a stud connected and disposed eccentrically with respect to one face of said disk, a sleeve mounted in said casing, a regulating rod adjustably mounted in said sleeve, a tension spring connected at one end to the stud on the disk and at its other end secured to the inner end of said rod, a stop projecting from the edge of the disk, and an adjustable abutment carried by the casing and extending in the path of said stop whereby the movement of the disk will be arrested in one direction.

4. A fluid pressure controller comprising a casing constituting a pressure chamber and having its bottom formed with an opening gradually increasing in diameter inwardly, said opening constituting an inlet, a removable cover secured to said casing and having an opening gradually decreasing in diameter outwardly and constituting an outlet, a partition within and integral with said casing, said partition provided with radially disposed ports for the passage of a fluid and forming said chamber into an inlet and an outlet compartment, a bearing stud projecting centrally from one face of said partition, an oscillatory controller disk mounted on said stud disposed in said outlet compartment, seated on said partition and provided with radially disposed ports or openings for the passage of the fluid, the ports of the disk adapted to register wholly or partly with the ports in the partition, a stud connected to and disposed eccentrically with respect to one face of said disk, an angularly disposed sleeve formed in the wall of said casing, a regulating rod adjustably mounted in said sleeve, and a tension spring connected at one end to the stud on the disk and at its other end to the inner end of said rod.

5. A fluid pressure controller comprising a casing constituting a pressure chamber and having its bottom formed with an opening gradually increasing in diameter inwardly, said opening constituting an inlet, a removable cover secured to said casing and having an opening gradually decreasing in diameter outwardly and constituting an outlet, a partition within and integral with said casing, said partition provided with radially disposed ports for the passage of a fluid and forming said chamber into an inlet and an outlet compartment, a bearing stud projecting centrally from one face of said partition, an oscillatory controller disk mounted on said stud disposed in said outlet compartment, seated on said partition and provided with radially disposed ports or openings for the passage of the fluid, the ports of the disk adapted to register wholly or partly with the ports in the partition, a stud connected to and disposed eccentrically with respect to one face of said disk, an angularly disposed sleeve formed in the wall of said casing, a regulating rod adjustably mounted in said sleeve, a tension spring connected at one end to the stud on the disk and at its other end to the inner end of said rod, a stop projecting from the edge of said disk, and an abutment projecting from the inner face of the casing and in the path of the stop whereby the movement of the disk will be arrested in one direction.

In testimony whereof I affix my signature in the presence of two witnesses.

WILLIAM G. HUGHES.

Witnesses:
A. M. WILSON,
R. HERMAN.